United States Patent Office 3,412,796
Patented Nov. 26, 1968

3,412,796
CONSOLIDATION OF SUBTERRANEAN
FORMATIONS
Henri G. G. Dekking, Cuyahoga Falls, Ohio, assignor to
Union Oil Company of California, Los Angeles, Calif.,
a corporation of California
No Drawing. Filed Aug. 17, 1966, Ser. No. 572,902
22 Claims. (Cl. 166—33)

ABSTRACT OF THE DISCLOSURE

A method of consolidating loose, incompetent earth particles in a subterranean formation in which a liquid comprising a resin-forming material polymerizable to a hardened vinyl-type polymer and a minor proportion of a polymerization promoting free radical type catalyst is injected into the formation through an injection well, and thereafter polymerization of the resin-forming material is initiated by injecting a cocatalyst through said well and into said formation.

---

This invention relates generally to the treatment of incompetent subterranean formations, and more particularly, to an improved method for consolidating subterranean formations by firmly binding the loose particles of the formation together with a hardened vinyl-type resin in a manner which maintains a substantially high degree of porosity and permeability.

Recoverable fluids, such as petroleum oil, gas and water, are frequently found in subterranean formations comprising unconsolidated, or loosely consolidated sand and sandstone. When such incompetent formations are pierced by a well bore and the connate fluids therein removed, the loose or weakly bound sand particles become dislodged and are entrained in the fluid. Some of the dislodged sand accumulates in the well bore and the other flow areas causing plugging and reduced fluid flow, while other of the sand is carried to the surface with the withdrawn fluid. These entrained particles cause severe erosion of underground strainers and liners, the producing string, pressure control valves, pumps and flow lines. Substantial quantities of the entrained sand are deposited in field storage tanks causing cleaning and disposal problems. In extreme cases, sufficient sand can be removed from the producing formation to create large underground voids, or cavities, which can collapse under the overburden pressure causing damage to the well. Thus, fluid production from incompetent subterranean formations can result in restricted flow and increased production and well maintenance costs, unless the entrainment of sand from the formation can be controlled or completely eliminated.

Various sand control measures, including various consolidation methods, have been employed in an effort to contain incompetent sand within a producing formation. The consolidation of subterranean fluid producing formations with resin binders has been previously proposed. In general, the prior art resin consolidation methods comprise the injection of a liquid resin-forming monomer or prepolymer, or a liquid solution of these materials, directly into the formation. These resin-forming materials are conventionally referred to in the well treating art as resins even though they have not been cured to a resinous state prior to injection. The resin monomer or prepolymer is then polymerized, or hardened, by the effect of temperature alone, or a curing agent can be admixed with the liquid resin or resin solution. Alternately, the curing agent can be separately injected as a second solution either preceding or following injection of the resin.

Substantial difficulties are encountered in consolidating incompetent fluid producing formations according to the various prior art techniques. For example, excessive quantities of resin are generally required and substantial permeability loss incurred from the injection of an undiluted resin, as the pore spaces between sand particles become completely filled with the injected resin. In the case where the resin is injected in diluted form, the resin is deposited onto the particle surfaces by adsorption. Complete utilization of the resin is generally not achieved, the unabsorbed resin being usually displaced from the consolidation zone with the solvent. Admixture of the curing agent with the resin prior to injection is also disadvantageous as the polymerization reactions start before injection can be effected, causing deposition of hardened resin in the injection equipment, tubing string, and well bore. Also, the solution viscosity is increased by the polymerization reaction requiring additional pressure to accomplish injection. Further, the partially polymerized resin does not readily bond to the particle surface. Injection of the curing agent as a second solution following injection of the resin does not necessarily afford good consolidation, as contact of the curing agent with resin previously deposited in the formation is not easily effected, especially where the resin and curing agent solutions have different mobility ratios.

While the curing rate can be retarded in some of the resin treating processes to permit placement of the resin solution in the formation before substantial polymerization occurs, the reaction rate is also sufficiently retarded that the well must be shut in for an extended period for curing prior to the resumption of production. Not only does this result in lost oil production, but also in increased rig time required for the consolidation operation. A further problem causing extended downtime in some consolidation treatments is that the formation temperature is too low for rapid curing of the resin. The additional step of installing a well heater to overcome this problem has been proposed, but this operation is in itself time consuming.

Thus, for the foregoing reasons, substantial permeability loss frequently results as the pore spaces between sand particles are partially, or completely, filled with resin; while the desired strength is generally not achieved because of the inability of the curing agent to fully penetrate the resin coating. In resin consolidation, as with other prior art consolidation techniques, it has not been possible to obtain sufficient adhesion of the resin to the particle surfaces to achieve the desired consolidation without too greatly reducing the porosity and permeability of the formation. Reduced permeability is a serious consequence in a fluid producing formation, inasmuch as expensive techniques are required to restore permeability, which at best are of only limited success.

Accordingly, it is a principal object of the present invention to provide an improved method of consolidating incompetent subterranean formations containing recoverable fluids. A further object is to provide an improved method for consolidating loose subterranean sand formations while retaining a high degree of porosity and permeability in the consolidated formation. A still further object is to provide an improved method of applying a hardened, resinous material to unconsolidated subterranean particles contained in a fluid producing formation. A yet further object is to provide a resin consolidation process in which the resin curing time is substantially reduced. Other objects and advantages of the invention will be apparent to those skilled in the art from the description which follows.

Briefly, the present invention concerns a method of consolidating incompetent subterranean formations wherein a thin coating of a hardenable vinyl monomer or prepolymer composition containing a catalyst is deposited relatively uniformly upon the surfaces of the earth particles comprising the formation to be consolidated and then polymerized into a hard, tenaciously adhering coating by treatment with a subsequently injected cocatalyst. The resin-forming material is injected into the formation in the form of a relatively low viscosity liquid or liquid solution and excess material removed from the consolidation zone prior to injection of the cocatalyst. Little or no polymerization occurs during the injection step since the vinyl monomer-catalyst mixture is relatively unreactive at formation temperatures normally encountered until contacted by the cocatalyst. However, once initiated, the polymerization proceeds rapidly to completion. By this technique, a loose or incompetent earth structure can be bound into a consolidated formation with compressive strength often exceeding 5000 p.s.i. without substantially diminishing the porosity or permeability of the structure.

In treating incompetent subterranean earth formations according to my invention, any convenient method of injecting fluids into the zone to be consolidated can be utilized. The choice of injection techniques will depend primarily on the type and placement of subsurface casings, liners and tubing strings, the type of production equipment, the injection equipment available to the operator, and the experience of the operator. Conventionally, the zone to be treated is isolated by setting mechanical packers in the well bore above and below the consildation zone. The vertical depth of formation to be consolidated can be controlled by the spacing between these packers. Generally, the zone to be treated can comprise a formation from about 2 to about 50 feet in vertical thickness, although it is preferred to treat a zone having a thickness of not more than 10 feet in a single injection step. Treatment of successive vertical layers of formation may be desirable in the case where a thick zone of incompetent sand is to be consolidated.

Because of the expense and time required to treat an incompetent formation, consolidation of only sufficient sand immediately adjacent the well bore to prevent displacement of the loose sand particles is preferred. Consolidation of the incompetent zone to a lateral distance of from about 1 to about 10 feet from the well bore is usually adequate; although, in any particular formation, consolidation to a greater horizontal penetration can be advantageous. In most applications, consolidation to a horizontal distance from about 3 to about 6 feet from the well is preferred. Although the preferred configuration of the consolidated zone can be defined as a cylinder symmetrically oriented about the well bore, because of differences in permeability, and because of differences in the vertical and horizontal injectivity profile and due to the effect of hydrostatic head, the actual consolidated zone will be somewhat irregular in shape. The assumption that the consolidated zone is a regular cylinder having a height equal to the desired depth of penetration is sufficiently accurate for computation of required treating volumes, etc. The volume of fluid required to fill the consolidated zone is the pore or interstitial volume defined by this cylinder.

The injected resin-forming material is deposited as a coating on the surface of the earth particles in the consolidation zone, and after removal of excess monomer, is then polymerized into a hardened structure binding the earth particles in the consolidation zone into a hardened porous mass of high compressive strength.

The resinous bonding material establishing the consolidated matrix of earth particles is a vinyl-type polymer formed by the addition polymerization of vinyl unsaturated monomers or prepolymers which contain the reactive group:

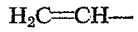

and by certain other unsaturated monomers which form addition polymers by mechanisms similar to that of the vinyl reaction. The term vinyl-type polymer is inclusive of both homopolymers of these materials and copolymers with two or more of these monomers or with other reactive monomeric materials. Many of the vinyl-type resins are particularly useful in the consolidation of incompetent hydrocarbon producing formations because they are relatively saturated compounds having low oil and water solubility and low chemical activity.

Typical of the resin-forming materials useful in forming vinyl-type addition polymers are polymerizable vinyl monomers selected from the following classes of compounds: olefins such as propylene, butylene, isobutylene, pentene, butadiene, isoprene, and the like; phenyl substituted olefins such as styrene and alkyl benzene; olefins having halogen substituents such as vinyl and vinylidine chloride having one or two appendant chloride atoms; olefins having an appendant carboxyl group such as acrylic and methacrylic acid; esters of an olefin such as methyl acrylate, methyl methacrylate, and vinyl acetate; and olefins having an appendant cyano group such as acrylonitrile and methacrylonitrile. Under the formation conditions generally encountered, sulfur dioxide reacts with vinyl hydrocarbons to form a copolymer of alternate hydrocarbon and sulfur dioxide molecules, in which case substantial quantities of sulfur dioxide are required. However, in the case of the vinyl compounds having non-hydrocarbon substituents, particularly such as olefins having appendant carboxyl, ester or cyano groups, the sulfur dioxide primarily exhibits a catalytic function and only extremely small quantities are required. Accordingly, preferred materials for the consolidation of earth formations are the aforementioned olefins having appendant non-hydrocarbon substituents, such as carboxyl, ester and cyano groups. Of these, methyl acrylate is particularly preferred in many consolidation applications. Another particularly preferred vinyl monomer is acrylic acid.

Exemplary of the unsaturated monomers which react similarly to the vinyl monomers are certain beta- or 2-substituted compounds such as coumarone and indene where the reactive group is in a ring structure. Coumarone and indene are usually commercially available as mixtures of the monomer which can be copolymerized to form a coumarone-indene copolymer. Accordingly, for purposes of this patent, the term "vinyl monomers" is inclusive of both the foregoing class of unsaturated monomers which form addition polymers by mechanisms similar to that of the vinyl reaction, and to prepolymers containing a reactive vinyl group to facilitate further polymerization.

The reactive monomer or prepolymer is injected into the formation in admixture with a catalyst which will promote a free radical-catalyzed polymerization. Catalysts useful in initiating the free radical type reaction include various peroxides and persulfates, such as benzoyl peroxide, acetyl peroxide, lauroyl peroxide, t-butyl hydroperoxide, hydrogen peroxide, and ammonium or potassium persulfate. Of these, hydroperoxides such as t-butyl hydroperoxide are preferred. The injected monomer contains a minor proportion of catalyst, usually less than about 10 percent by weight, and more preferably less than 5 percent by weight. The mixture of vinyl monomer and catalyst is not highly reactive at formation conditions of temperature and pressure until contacted by a small quantity of sulfur dioxide. Although the exact mechanism of the reaction is in doubt, it is believed that the sulfur dioxide reacts with the catalysts to form free radicals which then initiate polymerization of the monomer by addition linkage at the active polymerization sites. The polymerization reaction is completed substantially instantaneously upon contact of the injected solution with sulfur dioxide, the resulting consolidated structure achieving the ultimate strength almost immediately without subsequent curing. The aforedescribed polymerization reaction is initiated by $SO_2$ at temperatures down to about $-40°$ F., and is readily initiated under all temperatures encountered in subterranean hydrocarbon fluid producing structures, i.e., from about $50°$ F. to about $400°$ F.

In one embodiment of the invention, a liquid slug of resin-forming monomer-catalyst mixture is injected into the formation to be consolidated in sufficient quantity to coat the earth particles in the consolidation zone. Since it is usually difficult to inject the exact amount of resin forming material required, it is often advantageous to inject an excess of this material and then to remove that not required to coat the earth particles so as to establish sufficient porosity in the formation to render it fluid permeable. Excess reactant mixture can be removed by displacement into the formation with an inert displacement fluid. A small quantity of gaseous or liquid sulfur dioxide is then injected into the formation to initiate the polymerization reaction.

In a more preferred embodiment of the invention, the displacement fluid is an inert gas such as nitrogen or air. Thus, excess resin-forming mixture is displaced into the formation by the injected gas. Upon displacement of this excess material, the gas injection is continued with the addition of a small quantity of sulfur dioxide to initiate the reaction.

Although the resin can be deposited without any preparation of the consolidation zone, improved results are obtained when the earth particles to be consolidated are free of oil and water. Oil can be effectively removed by injecting a wash liquid into the consolidation zone in an amount equal to or exceeding the pore volume of the consolidation zone. As the liquid is injected into the zone, portions of the connate oil and water are displaced into the formation. However, most formations cannot be rendered oil-free merely by displacement of the connate fluids, but require successive washing steps. Any wash liquid capable of removing oil from the sand particles can be employed, preferred wash liquids being those liquids miscible with the connate oil at formation conditions. Suitable solvents include petroleum distillate fractions, such as diesel oil, gas condensate, aromatic hydrocarbons, substituted aromatic hydrcarbons, ketones, alcohols, and detergent water solutions. A preferred wash liquid is a petroleum distillate fraction high in aromatic content.

After a soaking period following injection of a first wash liquid, the first wash liquid is displaced into the formation with a subsequent treating fluid or a second wash liquid. Successive wash steps can be employed, using the same or different wash liquids, until eventually all of the connate oil is removed from the consolidation zone. One or more of these liquids can be heated to effect more efficient oil displacement, particularly in heavy oil formations and where relatively low formation temperatures are encountered.

While most of the vinyl monomers can be successfully polymerized in the presence of water, residual water in the formation can detrimentally affect the strength of the resin-sand bonds, thus lowering the compressive strength of the consolidated formation. Residual water can be removed from interstitial spaces and sand surfaces within the consolidation zone by dehydration. Dehydration can be accomplished by passing a hot gas through the consolidation zone to vaporize the water, the gas carrying the water vapor from the consolidation zone into the formation. Preferably, dehydration is accomplished by injecting a hydrophilic solvent into the consolidation zone. Preferred solvents include alcohols, ketones, and like hydrophilic liquids. A particularly preferred dehydrating agent is anhydrous isopropyl alcohol. Dehydration and oil removal can be accomplished in a single preparation step using a single treating liquid where the selected liquid possesses both hydrophilic and solvent properties. A single combined wash and dehydration step is frequently preferred where gas sands are to be consolidated.

Resin strength and stability can be increased by adding a small amount of a cross-linking monomer, such as N,N'-methylene bis-acrylamide, to the monomer liquid injected into the formation. Such materials are copolymerized with the resin monomer and also form cross-linked bonds.

The improved consolidation method of this invention is demonstrated by the following examples which are presented by way of illustration, and are not intended as limiting the spirit and scope of the invention as defined by the appended claims.

EXAMPLE I

The method of this invention is demonstrated by the consolidation of a loose, incompetent sand. This sand, 43.58 grams of 50 mesh flint shot Ottawa silica sand, is placed in a 1-inch diameter glass tube having a screen at the bottom to support the sand. A resin is prepared by mixing 0.5 cc. of t-butylhydroperoxide with 20 grams of methyl acrylate. The commercial methyl acrylate contains 15 p.p.m. of hydroguinone monomethyl ether added to inhibit polymerization during storage. The liquid mixture is poured over the unconsolidated sand and excess liquid allowed to drain from the bottom of the tube. Excess resin is removed from the sand body by pulling a slight vacuum at the bottom of the tube. The sand body is observed to be loose and unconsolidated. Sulfur dioxide gas is then passed through the tube. Two minutes after the introduction of the sulfur dioxide, the glass was broken away from the sand body. The core is consolidated into a hard porous mass exhibiting high compressive strength and high permeability. The polyacrylate content of the consolidated core is calculated at 7 percent of the core weight.

EXAMPLE II

The experiment of Example I is repeated to demonstrate the utility of acrylic acid in consolidating loose sands. In this test, 38.0 grams of sand was placed in a 1-inch diameter glass tube. A mixture of 10.0 cc. of acrylic acid and 0.2 cc. t-butyl hydroperoxide is poured over the sand and allowed to drain from the tube. Excess resin is removed from the sand body by pulling a slight vacuum at the bottom of the tube. The sand body remained loose and unconsolidated. Sulfur dioxide gas is then passed through the tube for two minutes, after which the glass is broken away from the sand body. The core is consolidated into a hard porous mass exhibiting high compressive strength and high permeability. The polyacrylic acid content of the consolidated core is calculated at 13 percent of the core weight.

EXAMPLE III

The stability of the resin prior to initiation is demonstrated by the following experiment. Approximately 10 cc. of inhibited methyl acrylate is placed in a screw cap jar and set on a steam bath for one hour. The methyl acrylate remained liquid with no observed polymerization.

EXAMPLE IV

The stability of the resin-catalyst mixture prior to initiation is demonstrated by placing a mixture of 10 grams of inhibited methyl acrylate and 0.25 cc. t-butylhydroperoxide in a screw cap jar and heating on a steam bath for one hour. The methyl acrylate remained liquid with no observed polymerization.

While particular embodiments of the invention have been described, it will be understood, of course, that the invention is not limited thereto since many modifications can be made and it is intended to include within the invention any such modifications as fall within the scope of the claims.

I claim:

1. A method of consolidating loose, incompetent earth particles in a subterranean formation penetrated by a well, which comprises:

injecting a polymerizable liquid comprising a resin-forming material polymerizable to a hardened vinyl-type polymer by addition polymerization and a minor proportion of a polymerization promoting free radical type catalyst through said well and into said incompetent formation;

removing the excess of said polymerizable liquid over that required to coat the earth particles to be consolidated; and polymerizing said resin-forming material coating said earth particles by the injection of a cocatalyst through said well and into contact with said coated earth particles.

2. The method defined in claim 1 wherein said resin-forming material is a vinyl compound containing a reactive vinyl group.

3. The method defined in claim 2 wherein said vinyl compound is an olefin having an appendant carboxyl, ester or cyano group.

4. The method defined in claim 1 wherein said resin-forming material is methyl acrylate.

5. The method defined in claim 1 wherein said resin-forming material is acrylic acid.

6. The method defined in claim 1 wherein said free radical type catalyst is selected from the group consisting of benzoyl peroxide, acetyl peroxide, lauroyl peroxide, t-butyl hydroperoxide, hydrogen peroxide, ammonium persulfate and potassium persulfate.

7. The method defined in claim 1 wherein said catalyst is t-butyl hydroperoxide.

8. The method defined in claim 1 wherein said cocatalyst is sulfur dioxide.

9. The method defined in claim 1 wherein the excess of said polymerizable liquid is displaced into the formation by injecting an inert displacement fluid.

10. The method defined in claim 9 wherein said displacement fluid is an inert gas and wherein said cocatalyst is sulfur dioxide which is added to a final portion of said injected displacement gas.

11. The method defined in claim 1 including the additional steps of displacing oil and dehydrating said formation prior to the injection of said polymerizable liquid.

12. The method defined in claim 1 including the addition of a cross-linking agent to said polymerizable liquid injected into said formation.

13. The method defined in claim 12 wherein said agent is N,N'-methylene bis-acrylamide.

14. A method of consolidating loose, incompetent earth particles in a subterranean formation penetrated by a well, which comprises:

injecting a polymerizable liquid comprising a resin-forming vinyl compound having a reactive vinyl group and a minor proportion of a catalyst selected from the group consisting of benzoyl peroxide, acetyl peroxide, lauroyl peroxide, t-butyl hydroperoxide, hydrogen peroxide, ammonium persulfate and potassium persulfate through said well and into said formation;

injecting an inert gas through said well and into said formation to displace excess of said polymerizable liquid over that required to coat the earth particles to be consolidated; and polymerizing said resin-forming vinyl compound coating said earth particles by adding sulfur dioxide to a final portion of said inert displacement gas.

15. The method defined in claim 14 including the additional steps of displacing oil and dehydrating said formation prior to the injection of said polymerizable liquid.

16. The method defined in claim 14 including the addition of a cross-linking agent to said polymerizable liquid injected into said formation.

17. The method defined in claim 16 wherein said agent is N,N'-methylene bis-acrylamide.

18. The method defined in claim 14 wherein said vinyl compound is methyl acrylate.

19. The method defined in claim 14 wherein said vinyl compound is acrylic acid.

20. The method defined in claim 14 wherein said vinyl compound is an olefin having an appendant carboxyl, ester or cyano group.

21. The method defined in claim 14 including the addition of a cross-linking agent to said polymerizable liquid injected into said formation.

22. The method defined in claim 21 wherein said cross-linking agent is N,N'-methylene bis-acrylamide.

References Cited

UNITED STATES PATENTS

| | | | |
|---|---|---|---|
| 2,940,729 | 6/1960 | Rakowitz | 166—33 |
| 3,175,612 | 3/1965 | Holbert et al. | 166—33 |
| 3,223,161 | 12/1965 | Burge | 166—33 |
| 3,268,002 | 8/1966 | Fischer | 166—33 |

STEPHEN J. NOVOSAD, *Primary Examiner.*